United States Patent [19]

Thessen

[11] Patent Number: 4,897,293

[45] Date of Patent: Jan. 30, 1990

[54] NOVEL ROOFING MEMBRANE AND METHOD OF MAKING

[75] Inventor: Charles Thessen, Franklin, Ky.

[73] Assignee: Kendall Company, Lexington, Mass.

[21] Appl. No.: 217,810

[22] Filed: Jul. 12, 1988

[51] Int. Cl.⁴ ............................ D06N 7/00; B29B 1/00
[52] U.S. Cl. ...................................... 428/40; 156/153;
156/242; 156/244.24; 156/244.25; 156/289;
264/175; 428/141; 428/500
[58] Field of Search .................... 428/343, 904.4, 141,
428/152, 155, 40, 500

[56] References Cited

U.S. PATENT DOCUMENTS

| | | | |
|---|---|---|---|
| 2,021,522 | 11/1935 | Schacht | 428/141 |
| 2,631,954 | 3/1953 | Bright | 264/175 |
| 2,879,547 | 3/1959 | Morris | 264/175 |
| 3,895,153 | 7/1975 | Johnston et al. | 428/141 |
| 4,035,218 | 7/1977 | Yount | 156/289 |
| 4,668,463 | 5/1987 | Cancio et al. | 264/556 |

*Primary Examiner*—David Simmons
*Assistant Examiner*—Mark Osele
*Attorney, Agent, or Firm*—Alvin Isaacs

[57] ABSTRACT

Novel procedures for preparing linear low density polyethylene adhesive-coated sheet materials having a rough, texturized surface rendering them particularly useful as non-slip roofing membranes; and novel adhesive-coated sheet materials obtained thereby.

10 Claims, No Drawings

NOVEL ROOFING MEMBRANE AND METHOD OF MAKING

BACKGROUND OF THE INVENTION

This invention relates to ice and water-protection membranes adapted to be positioned over the eaves of sloped roofs.

In construction of sloped roofs on buildings, it is of course necessary to protect the plywood, masonry, metal or other roof surface from degradative environmental forces such as ice and water.

In a typical roofing system, the ends of the slope are protected by a so-called ice and water-protection membrane comprising a water-impermeable backing material carrying a pressure-sensitive adhesive layer for securing the protective membrane to the roof surface. These adhesive-containing membranes may for example, be on the order of three feet or more in width and may typically be on the order of 40 mils or thicker. They generally come in rolls and are applied across the length of the lower edges of the roof slope.

A vapor barrier such as tar paper or the like is then secured to the roof extending over the peak or ridge of the roof and to the edges of the thus applied membranes to cover the remainder of the exposed surface of the plywood or other roof surface, after which shingles or other surface material of choice is laid down to complete the roofing construction.

If the membranes to which this invention is directed have a smooth outer surface, it presents a safety hazard to the workmen installing the roofing material. Because of its positioning at the lower edges of the slope, it sometimes happens that a workman will slip on the membrane surface and, with nothing to hold onto to stop his fall, will then slide off the roof.

A logical answer to this problem would be to provide a texturized or roughened outer surface for better traction. While this solution may be easy to deduce, the manufacture of such a product on commercial scale and in a viable, competitive cost-effective manner is not a simple task.

It is to this problem which the present invention relates. The task of the present invention, stated simply, is to provide an efficient and cost-effective system for the manufacture of ice and water-protection membranes adapted for placement under the eaves of sloping roofs, which membranes have a non-smooth outer surface adapted for providing the traction necessary to inhibit, if not precluding entirely, the danger of workmen slipping and falling during roofing construction.

BRIEF DESCRIPTION OF THE INVENTION

In accordance with the present invention this task is solved in an elegant manner by the steps of: (I) forming the roofing membrane substrate having a smooth and a roughened or texturized surface by a calendering operation to be described in detail hereinafter; and, thereafter (2) applying a layer of a pressure-sensitive adhesive to the smooth surface.

DETAILED DESCRIPTION OF THE INVENTION

As stated previously, the present invention relates to ice and water-protection adhesive membranes adapted for placement over the eaves of a sloping roof, which membranes are characterized by having a surface which may be defined as being texturized or roughened in order to provide better footing for workers applying the roofing system. The membrane substrate is prepared utilizing a calendering system whose principles are somewhat similar to that described and claimed in U.S. Pat. No. 2,631,954 issued to Bright and assigned to The Kendall Company, assignee of the instant invention.

In accordance with the teachings of this patent, a molten mass of ethenoid polymer, e.g. polyethylene, is deposited at the nip of the first and second rolls of a three roll calendar. The first roll, which operates at a substantially slower speed than the second roll, is heated (preferably internally) to a temperature above the melting point of the particular polymer mass employed, e.g. 270° F. for polyethylene. The second roll is heated (preferably internally) to an elevated temperature below the melting point of the particular polyethylene being used, e.g. 190° F. Since the first roll rotates at a substantially lesser speed than the second roll, under the given temperature conditions the mass deposited at the nip will be extruded between the nip of the two rolls to form a layer of substantially uniform thickness conforming to the spacing or gap of the nip, which layer will adhere to the surface of the second roll. The layer is then carried from the surface of the second roll into contact with the third roll rotating at the same speed as the second roll but chilled relative thereto and having a surface temperature of, for example, on the order of 50° F. to 70° F. The sheeted layer is stripped from the second roll and passed around the third roll to a takeup roll.

As is stated in the paragraph bridging Columns 3, 4 of the patent, the first roll is preferably rotated at a very slow speed sufficient to equalize wear over its entire surface area. The speed of the second roll is then adjusted for satisfactory operation at a greater surface speed. When the speed ratio is maintained in the range of from 5:1 to 30:1, and preferably at 15:1, the action at the nip is such that the polymer mass is subjected to a drawing action prior to passage into or during passage through the nip under the frictional influence of the surfaces of the first and second calendar rolls operating at the differential in surface speeds; and this drawing action results in a molecular orientation in the direction of advance prior to emergence of the material from the nip in its sheet form adherent to the second calendar roll, so that the sheet as formed on the second roll exhibits longitudinal molecular orientation.

In Column 4 it is stated that the sheet emerging from the nip has different surface characteristics. Its inner surface adherent to the second roll is smooth; while the upper or opposed surface is rougher, having a matte appearance. The difference in surface characteristics is explained in the patent as being the result of the action at the nip. Apparently, the portion of the mass which contacts the second roll in advance of the nip is cooled to form a skin which is carried through the nip at the speed of advance of the second roll. The first roll surface, however, advances at a less speed, causing a drag on the material so that the upper surface of the sheet comes off the first roll at a speed greater than the speed of the first roll, with resulting roughness.

As is further taught in the patent, the matte or rougher side possesses highly favorable adhesive-receptive and retentive characteristics for coatings, e.g. solvent-, heat- or pressure-sensitive adhesives. Consequently, the patent clearly teaches the efficacy of applying an adhesive coating to the rougher or matte surface of a film formed in the aforementioned calendering operation.

U.S. Pat. No. 2,879,547 relates to a somewhat similar 3-roll calendering operation for preparing fused film laminates, e.g. pressure-sensitive adhesive tapes. As is described and claimed therein, a thermoplastic material, which may, for example, be polyethylene or a blend of polyethylene and another polymer, is applied in molten form at the nip of the first and second rolls and the resulting film having a matte upper surface is transported from the second roll to the nip of the third roll where another thermoplastic material, e.g. a pressure-sensitive adhesive introduced at the nip between the second and third layers is deposited on the matte surface.

The essence of the present invention, simply stated, is that the task of providing water-protection roofing membranes having a rough or irregular surface for better footing may be solved simply and efficiently by utilizing linear low density polyethylene for forming the roofing membrane on a 2-roll calender, which membrane has a smooth surface and a rough surface, and then applying the adhesive coating to the membrane on the smooth surface rather than on the rougher surface, as has been the practice since the inventions described and claimed in the aforementioned patents.

Critical to the practice of this invention is the use of linear low density polyethylene (LLDPE) in lieu of the other polyethylenes known in the preparation of adhesive backing materials, e.g. low density polyethylene (LDPE) and/or high density polyethylene (HDPE). LLDPE has been found to provide films by calendering in the heretofore described manner which have an appreciatively rougher or more textured surface than the matte surface described in the aforementioned patents.

In general, LLDPE is well known and is described in detail, for example, in "Encyclopedia of Polymer Science and Engineering" Volume 6, John Wiley & Sons, pp. 429-454, which publication is incorporated by reference herein. As is known, Linear polyethylene contains no long-chain branching, but may contain short-chain branching. In general, LLDPE films contemplated by this invention will have a melt index on the order of 1-3 and a density (g/cm$^3$) of on the order of 0.918-0.935.

While not intended to be limited by any particular theory, it is believed that the marked superiority of LLDPE in the practice of this invention is due to the inherent melt fracture properties of LLDPE. Melt fracture may be described as a severe distortion of the extrudate which can take many forms, e.g. spiraling, bambooing, regular ripple, random fracture, etc. These irregularities are understood to be caused when the polymer, having been brought up to melt temperature, is subjected to a critical shear stress. For example, in the contemplated calendering system, there is a fracture or separation of the surface of the film when the film formed by depositing a mass of the molten polymer at the nip of the calendar rolls is stressed faster than it can accommodate and this stress in turn will provide a very pronounced irregularity or roughening of one film surface, the other remaining smooth.

In accordance with the practice of this invention, the LLDPE is deposited at the nip of the rolls of a 2-roll calendar, the first roll of which is operated at a greatly slower speed than that of the second and roll, as previously described. In general, the ratio of the speed of rotation of the second roll to the first roll will be at least 80:1. By way of illustration, the first roll may rotate at the speed of on the order of 3-50 inches per minute, speeds of on the order of five inches per minute being preferred, and the second roll may rotate at speeds of on the order of 8-50 yards per minute.

The surface of the first roll will be maintained at a temperature above the melting point of the LLDPE mass. If the surface of this roll is too cold, the calendering forces become too great for acceptable thickness control. On the other hand, if it is too hot, oxidation of the LLDPE may occur. The selection of the particular surface temperature to be employed will be well understood by those skilled in the art in the light of the present description. However, for purposes of illustration, it will generally be on the order of 350°-500° F.

The second roll will have an elevated temperature below the melting point of the LLDPE. If this temperature is too cold, there is a tendency for the problem of forming edges on the resulting film. In general, the temperature for the surface of the second roll will be on the order of 160°-210° F. Again, the selection of the particular temperature to be employed will be readily apparent to the skilled worker.

The gap between the respective rolls will be maintained in known manner to provide LLDPE films of the desired thickness, e.g. 12-50 mils, thicknesses of on the order of 12-25 having been found to be particularly efficacious for the contemplated roofing membranes.

In the practice of this invention, the respective gaps are adjusted to provide the selected film thickness, the rolls are heated, preferably internally, to the desired temperatures, and their respective speeds of rotation are set, as described.

A mass of LLDPE, previously heated, e.g. 380°-420° F., to soften it for calendering is then deposited at the nip of the first and second rolls. The resulting film having the described roughened and smooth opposed surfaces is taken off the second roll and is cooled, e.g. by running through a series of cooling baths and is now ready for application of an adhesive layer.

However, in accordance with this invention, the adhesive, e.g. a per se known pressure-sensitive adhesive, will be applied to the smooth surface of the film, rather than the rough surface, as taught by the prior art exemplified by the aforementioned patents.

In general, the adhesives which may be employed to prepare the roofing membranes of this invention are well known and per se comprise no part of this invention. Preferred are rubber-based pressure-sensitive adhesives such as those heretofore employed. As is known, these adhesives will comprise at least one rubbery elastomer and at least one tackifying resin along with other additives performing specific desired functions, e.g. a colorant such as carbon black, fillers, antioxidants, etc.

The elastomers employed in such adhesives may be defined as being polymeric materials having rubber-like properties. Examples of such materials include natural rubber, cyclized rubber, styrene-butadiene copolymer (SBR), acrylonitrile-butadiene copolymer (NBR), chlorinated rubber, polychloroprene (neoprene), rubber hydrochloride, polysulfide rubber, carboxylic elastomers, silicone rubber, polyurethane rubber, acrylonitrile-butadiene-styrene (ABS), reclaimed rubber, butyl rubber, polyisoprene, polyisoutylene, ethylene-propylene-diene monomer terpolymer rubber (EPDM), the "KRATON" (trademark of Shell Chemical) family of rubbery polymers, etc.

The adhesive may be applied to the smooth side of the LLDPE membrane by any of the per se known coating techniques, e.g. hot melt applicators, extrusion coating, etc. However, a preferred method is by calendering wherein a mass of the adhesive is deposited in the usual manner between superposed calendar rolls to provide an adhesive layer of the desired thickness, e.g. from about 15 to about 50 mils thick. The resulting adhesive-coated sheet material may then be taken-up on a roll or cut into desired lengths, as desired. In any event, a standard release sheet should be applied against the adhesive surface to prevent premature unwanted adhesion and, in the case of rolls, ease of unwind without sticking to the backing. The release liner may be applied during the calendering or other coating operation for applying the adhesive layer or it may be applied downstream from the coating operation.

The smooth surface of the LLDPE prepared in accordance with this invention has been found to bond well to the adhesive layer applied thereto without the aid of Corona Discharge treatment, tie coats and the like. However, it is within the scope of this invention to employ such procedures to increase the adhesive/membrane bond where found desirable or expedient to do so.

As mentioned previously, the preferred method of applying the adhesive is by calendering.

By way of illustration, a molten adhesive mass may be applied to the film as it advances at the nip of a two-roll calender wherein the first or top roll heated to a surface temperature on the order of 160°-210° F. rotates at a speed of, say, 8-50 yards per minute; and the bottom or second roll heated to a surface temperature above that of the top or first roll, e.g. on the order of 330° F. rotates at a much slower speed than the first roll.

While reference is made in the foregoing description to employing a 2-roll calender in both calendering operations, namely to form the membrane and then to apply the adhesive layer to the thus formed membrane, it will be appreciated that a three-roll calender as described above with one roll rendered inoperative may be employed in lieu thereof, in which case the 3-roll calender will function effectively as a two roll calender.

For example, if a 2-roll calender is not readily available and/or if the manufacturing facility is set up for a 3-roll calendering operation, there is no need to alter the production line to employ a 2-roll calender.

To illustrate further, the LLDPE membrane may be formed with the first two rolls of a 3-roll calender, as described above, with the third roll inactivated, out of contact with the second roll and therefore inoperative. The same 3-roll calender may, and in the following illustrative examples was used to apply the adhesive, in which case the second roll was maintained at the same speed and temperature, the first roll is inactivated, and the adhesive is applied at the nip of the second and third rolls as the film advances therethrough with the smooth surface up to receive the adhesive deposit.

The following examples show by way of illustration and not by way of limitation the practice of this invention.

EXAMPLE 1

Approximately 1,200 yards of 36" wide membrane material were made in this Example.

A blend of molten LLDPE consisting of about 99 percent LLDPE and about 1 percent carbon black heated to soften in a 2-roll mill was applied at the nip of the first and second rolls of a 3-roll calendar as described above. The first roll set to rotate at about 5 inches per minute was heated internally to a temperature of about 420° F.; the second roll set to rotate at about 8 yards per minute was heated internally to a surface temperature of about 185° F.; and the third roll was inactive but was set to rotate at about 1 yard per minute was heated internally to provide a surface temperature of about 320° F. The gap between the respective rolls was set to provide a film on the order of 21 mils. The resulting film coming off the second roll of the calender was passed through a series of cooling baths referred to in the art as "cooling cans" to lower the temperature and was then cut into two lengths of about 600 yards each. Each length was wound onto a take-up roll. The resulting membrane was found to have an average thickness of 21.2 mils with a standard deviation of ±0.88. It exhibited a tensile strength of 45.6 pounds per inch width ±1.8 deviation; and it possessed an elongation of 330 percent ±69 percent. A standard butyl rubber-based pressure-sensitive adhesive with tackifier was then calendered onto the smooth surface of the membrane (using the second and third rolls of the above-mentioned calender) to provide a total thickness (membrane +adhesive layer) of 42.5 mils ±1.26 standard deviation. A conventional silicone release sheet was applied to the adhesive surface during the calendering operation and the resulting adhesive-coated roofing membrane was then slit into 36"X90' lengths which were wound onto a take-up roll. The resulting product was characterized visually as having a roughened, texturized surface.

EXAMPLE 2

Example 1 was repeated, changing the roll temperature to 400°, 170° and 320° F., respectively and the second roll speed to 12 yards per minute. A similar product was obtained.

EXAMPLE 3

Example 1 was repeated again, changing the respective roll temperature to 430°, 180° and 330° F. respectively and the second roll speed to 9 yards per minute. Again, a similar product was obtained.

EXAMPLE 4

Example 1 was repeated once again, changing the roll temperature to 410°, 175° and 330° F., respectively, and the second roll speed to 12 yards per minute. Once more, a similar product was obtained.

From the foregoing description and illustrative examples it will thus be seen that the present invention provides a simple and elegant system for providing what may be characterized as being "non-slip" roofing membranes, one surface of which is roughened to provide good traction, the other bearing a pressure-sensitive adhesive layer for adhering the membrane to the roof surface.

As was mentioned previously, critical to this invention is the use of LLDPE specifically as the membrane material and forming the membrane in the described calendering operation. Apart from the described calender, no special equipment or process steps, e.g. embossing, stamping and the like, is required. Accordingly, the novel process of this invention is well suited for commercial production.

While in the foregoing illustrative examples the film was first taken up on rolls and later unwound for application of the adhesive layer, it will be appreciated that in alternative production runs the membrane sheets may be advanced from the membrane-forming calendering station through a cooling station, then directly to a calender or other adhesive-applying station, after which it is advanced to a slitting station and finally taken up for packaging and shipment on rolls of a predetermined desired length, e.g. 50 feet, 90 feet, or whatever.

Since certain changes may be made without departing from the scope o the invention herein described, it is intended that all matter contained in the foregoing description, including the examples, shall be taken as illustrative and not in a limiting sense.

What is claimed is:

1. A method of making a skid-resistant ice and water protection roofing membrane comprising the steps of:
   (1) applying a mass of linear low density polyethylene at the nip of two calender rolls wherein one of said rolls is heated above the melting point of said linear low density polyethylene and is rotating at a first relatively low speed, the other of said rolls being heated to a temperature below the melting point of said linear low density polyethylene and is rotating at a second substantially greater speed than said one roll, thereby forming a membrane characterized by having a substantially smooth surface adherent to said other roll and an opposed roughened or texturized surface;
   (2) removing said membrane from said other roll; and
   (3) thereafter applying a layer of adhesive to said smooth surface, thereby providing a roofing membrane characterized by having an adhesive layer on one surface thereof, the opposed surface being roughened or texturized.

2. A method as defined in claim 1 wherein said adhesive layer is applied to said smooth surface by a second calendering step.

3. A method as defined in claim 2 wherein said adhesive is a rubber-based pressure-sensitive adhesive.

4. A method as defined in claim 1 wherein the ratio of the speed of rotation of said other roll to said one roll is at least 80:1.

5. A method as defined in claim 1 wherein the speed of said one roll is from about 3 to about 50 inches per minute.

6. A method as defined in claim 5 wherein the speed of rotation of said other roll is from about 8 to about 50 yards per minute.

7. A method as defined in claim 1 wherein said membrane is from about 12 to about 50 mils thick.

8. A method as defined in claim 1 wherein said adhesive layer is from about 15 to about 50 mils thick.

9. A method as defined in claim 1 including the step of applying a release sheet to the surface of said adhesive layer.

10. A roofing membrane prepared by the process as defined in claim 1.

* * * * *